United States Patent [19]

Takahashi et al.

[11] Patent Number: 5,614,023
[45] Date of Patent: Mar. 25, 1997

[54] APPARATUS FOR APPLYING A THIN FILM OF MAGNETIC LIQUID FROM AN EXTRUSION-TYPE HEAD TO A FLEXIBLE BAND-LIKE WEB

[75] Inventors: Shinsuke Takahashi; Norio Shibata, both of Kanagawa, Japan

[73] Assignee: Fuji Photo Film Co., Ltd., Kanagawa, Japan

[21] Appl. No.: 966,333

[22] Filed: Oct. 26, 1992

Related U.S. Application Data

[62] Division of Ser. No. 683,905, Apr. 11, 1991, Pat. No. 5,202,164.

[30] Foreign Application Priority Data

Apr. 13, 1990 [JP] Japan ................................ 2-96285

[51] Int. Cl.$^6$ ........................................................ B05C 3/02
[52] U.S. Cl. ............................ 118/410; 118/413; 118/416; 118/419
[58] Field of Search ..................................... 118/256, 410, 118/413, 416, 419

[56] References Cited

U.S. PATENT DOCUMENTS

| | | | |
|---|---|---|---|
| 4,068,614 | 1/1978 | Kopachkov | 118/674 |
| 4,386,998 | 6/1983 | McIntyre et al. | 118/410 X |
| 4,480,583 | 11/1984 | Tanaka et al. | 118/410 |
| 4,681,062 | 7/1987 | Shibata et al. | 118/410 |
| 4,717,603 | 1/1988 | Chino et al. | 427/434.3 |
| 4,776,997 | 10/1988 | Chino et al. | 118/410 X |
| 4,995,338 | 2/1991 | Morita et al. | 118/410 |
| 5,028,450 | 7/1991 | Naka et al. | 118/410 X |

FOREIGN PATENT DOCUMENTS 62-95169  5/1987  Japan .

OTHER PUBLICATIONS

Patent Abstracts of Japan, vol. 11, No. 307 (C–450) Oct. 7, 1987 & JP–A–62 95 169 (Fuji Photo Film) May 1, 1987.

*Primary Examiner*—David A. Simmons
*Assistant Examiner*—Paul M. Rivard
*Attorney, Agent, or Firm*—Sughrue, Mion, Zinn, Macpeak & Seas

[57] ABSTRACT

A method of applying a liquid to a flexible substrate and more particularly to a method in which a magnetic liquid or the like is applied to a flexible area so that a thin liquid film is disposed on the carrier for manufacturing an application-type magnetic recording medium. The method includes positioning carrier and a back edge portion of an application head near each other, discharging the liquid from a slot provided in the head and lapping the carrier and the doctor edge portion of the head, located downstream of the slot, with each other at a predescribed lap angle for the application, and thereafter performing the application. The method further includes moving a path roller which is disposed upstream of the head and to adjust the lap angle, discharging the liquid from the slot of the head and moving the carrier to the head. According a further aspect of the invention, a downstream roller is moved in the direction of the carrier to further adjust the lap angle of the doctor edge portion. According to a further aspect of the invention, rather than translating the path rollers, the head is rotated a predescribed angle such that the back edge portion of the head is first placed near the carrier. Thereafter, liquid is discharged from the slot and the head is rotated so as to properly set the lap angle of the doctor edge portion.

4 Claims, 3 Drawing Sheets

APPARATUS FOR APPLYING A THIN FILM OF MAGNETIC LIQUID FROM AN EXTRUSION-TYPE HEAD TO A FLEXIBLE BAND-LIKE WEB

This is a divisional of application Ser. No. 07/683,905 filed Apr. 11, 1991, now U.S. Pat. No. 5,202,164.

BACKGROUND OF THE INVENTION

Field of the Invention

The present invention relates to a method of application, and more particularly to a method in which a magnetic liquid, a surface protective liquid, an undercoat liquid, a lubricating liquid or the like is applied to a long wide flexible carrier such as a plastic film, paper, foil or the like so that a thin liquid film is disposed on the carrier for manufacturing an application-type magnetic recording medium. Additionally the invention relates to an apparatus for doing the same.

Each application-type magnetic recording medium mentioned herein is manufactured by applying a liquid having a desired thickness to the surface of a nonmagnetic flexible band-like carrier (which is hereinafter referred to as a web) being continuously conveyed in a prescribed path and is thereafter dried. Therefore, the application-type magnetic recording medium is very different in regard to the manufacturing process from a magnetic recording medium of so-called non-application type, which is manufactured through ion plating, sputtering, vacuum evaporative deposition or the like.

Most magnetic recording media manufactured and sold for audio, video and data processing machines are still of the application type. Although some of the media of the application type are manufactured using a gravure application method, a reverse roller application method, a doctor blade application method and so forth, most of the media are manufactured in an extrusion-type application method because the products manufactured in this manner are higher in stability and lower in cost than those manufactured in the former methods. However, the extrusion-type application method has disadvantages in that the web is scraped using an extrusion-type application head resulting in the web becoming streaked or contaminated. This problem is more likely to arise at the beginning or end of the application of the liquid to the web, particularly when the slot of the outlet edge portion of the extrusion-type application head is protrusively disposed at a prescribed lap angle to the web supported on the path rollers. Accordingly, the scraping of the web by the head and the resulting streak on the film of the applied liquid are much more likely to occur at the initial stage of the application of the liquid to the web.

To solve these problems, an extrusion-type application method was proposed as disclosed in Japan Patent Application (OPI) No. 95169/87 (the term"OPI" as used herein means an "unexamined published application"). In the method, the applying head of the device and a web are moved relative to each other and the timing of the contact of the head with the web and the subsequent discharge of liquid are controlled.

However, the above-mentioned problems cannot completely be solved by the application device and the application method disclosed in the abovementioned Japanese Patent Application. In other words, chips are likely to be scraped from the web by the edge of the head at the beginning of the application and become trapped at the upstream edge of the doctor edge portion of the application head of the device resulting in streaking of the liquid film on the web.

In recent years, it has become more apparent that the speed of the web when applying liquid thereto has been increased to enhance the quality and recording density of an application-type magnetic recording medium and improved the productivity therefor. Along with that trend, problems relating to the streaks on the web and the scraping of the web at the beginning of the application have become more severe. Specifically, the streaks and the scraping of the web tend to occur more often as the application speed is increased. This is also a problem.

The present invention was made in consideration of the above problems. Accordingly, it is an object of the invention to provide a method of applying a liquid so as to very precisely prevent the occurrence of a streak and/or a longitudinal streak, to consistently manufacture a high-quality magnetic recording medium with high yield and productivity.

SUMMARY OF THE INVENTION

In the method provided in accordance with the present invention, the liquid is continuously discharged from the slot of an extrusion-type application head facing the surface of a flexible band-like carrier being continuously run while being supported on path rollers, so that a thin film of liquid is applied to the surface of the carrier. The method is characterized in that when the application is to be started or resumed, the carrier and the back edge portion of the application head are placed near each other or in slip contact with each other, the liquid is thereafter discharged from the slot of the head, and the carrier and the doctor edge portion of the head, which is located downstream of the slot with regard to the direction of the running of the carrier, are thereafter lapped with each other at a prescribed lap angle for the application.

BRIEF DESCRIPTION OF THE DRAWING

The method, which is an embodiment of the present invention, is hereafter described in detail with reference to the drawings attached hereto.

DETAILED DESCRIPTION OF THE PREFERRED EMBODIMENT

Figure 1:
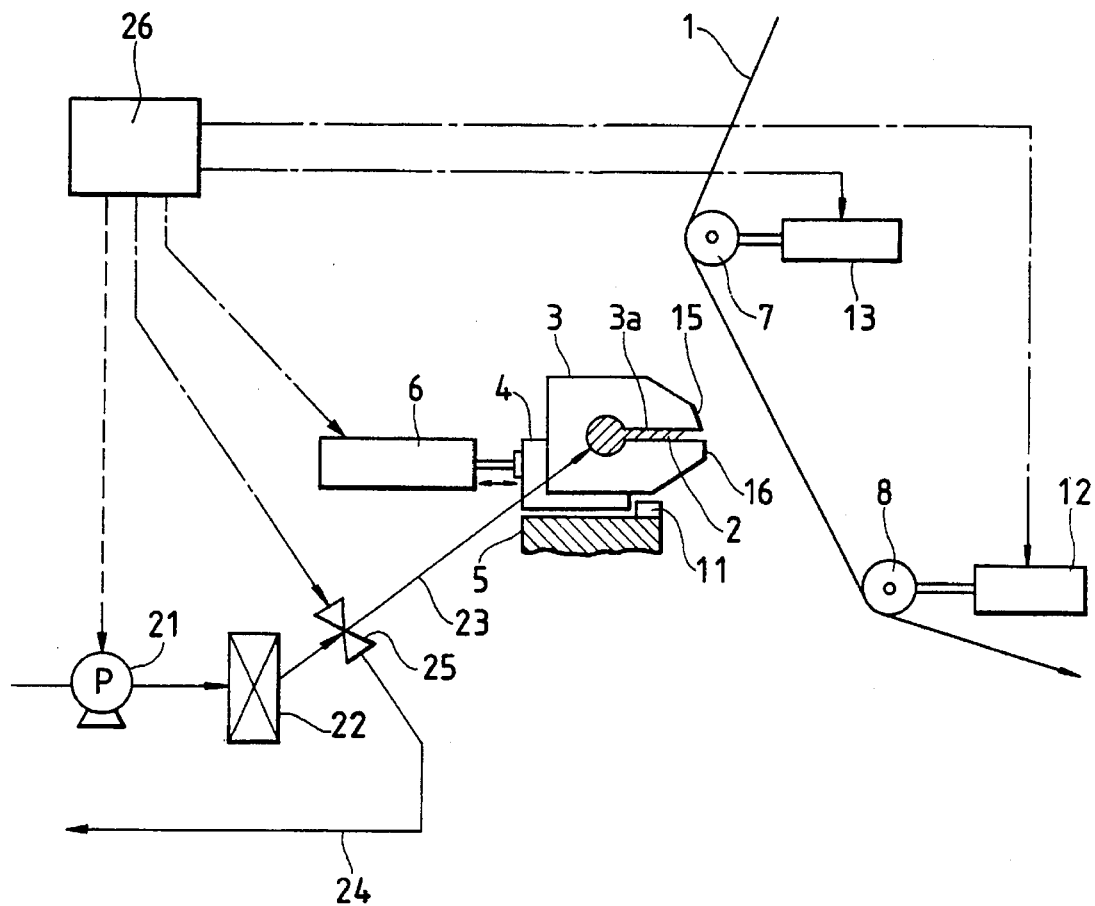
FIG. 1 is a schematic view of an application device for applying a magnetic liquid 2 to a web 1 using the method.

As shown in FIG. 1, the extrusion-type application head 3 is secured to a holder 4 and supported by a base 5 so that the head can be moved relative to the surface of the web 1 which is run at a prescribed speed while being supported on an upstream path roller 7 and a downstream path roller 8. The holder 4 is coupled to a head position changer 6 by which the head 3 can be moved back and forth in the direction of the thickness of the web 1 as illustrated by the arrow. A stopper 11 for positioning the head 3 is provided on the base 5 in front of the head. The path rollers 7 and 8 can be moved by roller position changers 12 and 13 to alter the running position of the web 1. The liquid 2 flows from a tank (which is not shown in the drawings) to a changeover valve 25 through a filter 22 by a constant flow rate pump 21. A liquid feed line 23 for supplying the liquid 2 to the application head 3 and a liquid discarding line 24 for returning the liquid to the tank or discarding the liquid from the tank can be connected to each other by the changeover valve 25.

The changeover valve 25, the head position changer 6 and the roller position changers 12 and 13 are operated by signals sent from a controller 26. If the liquid discarding line 24, which may be eliminated, is not provided, the supply of the liquid 2 can be controlled by turning on and off the pump 21. The controller 26 supplies drivers with control signals for activating the path rollers 7 and 8, the application head 3, the constant-quantity pump 21, the changeover valve 25 and so forth, or supplies the drivers with control signals for deactivating them in response to detection signals from limit switches.

Of course, the invention is not to be limited in this regard. For example, timers may be provided instead of the limit switches so as to generate the latter control signals to regulate the time of operation of each of the drivers to properly position the object which is operated by the driver. Further, light, magnetism, voltage or the like may be used as a means for detecting the position of the object. The timer may be used along with the position detector. A combination of a moving mechanism and a position detector such as a screw mechanism and a pulse motor may be used instead of the driver and the position detecting means. The position changers 6, 12 and 13 for positioning the application head 3 and the path rollers 7 and 8 are not confined to being particular units, but may be pneumatic or hydraulic cylinders, gear mechanisms, screw mechanisms or whatever is appropriate. The application head 3 is not confined to being oriented as shown in the drawings.

Figure 2:
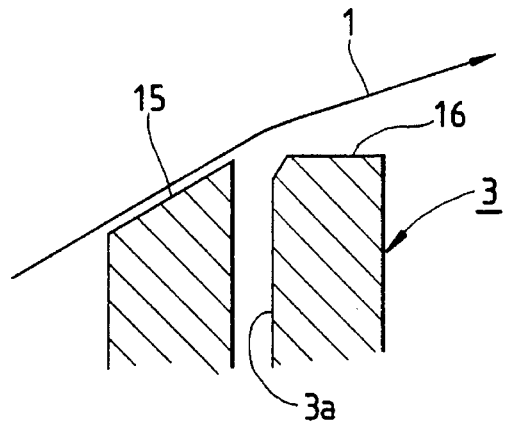
FIGS. 2, 3 and 4 are sectional views showing the positional relationship between the edge portion surface of the extrusion-type application head 3 of the device and the web 1.
Figure 3:
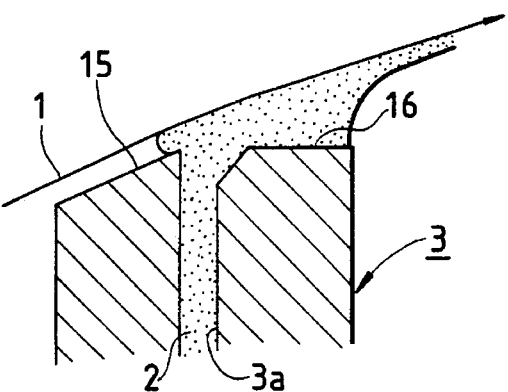
Figure 4:
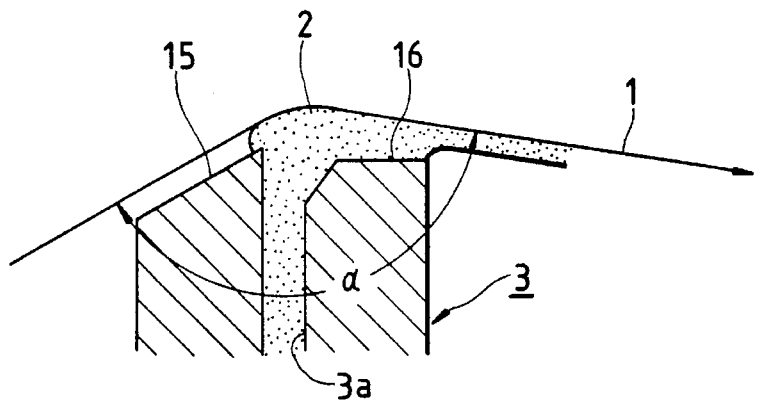

The basic operation using the device constituted as described above is as follows. The application head 3 and the web 1 are separated from each other as shown in FIG. 1. Thereafter, liquid 2 is supplied into the slot 3a of the head. After the necessary quantity of liquid is supplied to the head, the changeover valve 25 or the pump 21 is then manipulated to stop sending the liquid to the head, and the position changers 6, 12 and 13 are, thereafter, appropriately operated to place the web and the head proximate each other, as shown in FIG. 2. To place the web 1 and the head 3 proximate each other as mentioned above, the web is positioned near the back edge portion 15 of the head or in slip contact therewith, the liquid 2 is thereafter sent to the head and discharged from the slot 3a thereof as shown in FIG. 3, and the web is subsequently lapped with the doctor edge portion 16 of the head, which is located downstream of the slot, so that a desired lap angle α is set for the application, as shown in FIG. 4. The lap angle α is formed between the portion of the web 1 facing the back edge portion 15 of the head 3 and the portion of the web 1 facing the doctor edge 16 of the head 3 during the lapping of the web.

In more detail, to place the web 1 and the back edge portion 15 of the head 3 in proper position with respect to each other, the upstream path roller 7, provided upstream of the head with regard to the direction of the running of the web, is moved relative to the back edge portion in the direction of the thickness of the web by the roller position changer 13 so that the web and the back edge portion are positioned relative to each other. Immediately, or within 0.5 seconds, thereafter, the liquid 2 is discharged from the slot 3a of the head 3. The head is thereafter moved straight toward the web 1 by the head position changer 6 so that the web and the doctor edge portion 16 of the head are positioned adjacent each other. To simplify the performance of the basic operation, the positional relationship between the head 3 and each of the path rollers 7 and 8 is sent in advance.

After the doctor edge portion 16 of the head is positioned adjacent the web, the liquid 2 is discharged from the slot 3a of the head, and the downstream path roller 8 is thereafter moved relative to the doctor edge portion in the direction of the thickness of the web by the roller positioned changer 12 so that the web and the doctor edge portion are positioned relative to each other to set the desired lap angle α for the application, as illustrated in FIG. 4.

After the basic operation is thus performed, the liquid 2 is applied to the surface of the web 1. Since the web 1 and the back edge portion 15 of the head 3 come into contact with each other at the beginning of the application, scraped chips are removed from the web at the initial stage of contact so that the chips are moved downstream, due to the flow of the liquid. More specifically, since the web 1 is not lapped with all the web-facing surface of the edge part of the head 3 at the initial stage of the contact and the time of the contact is very short, the scraped chips are not trapped at the upstream edge of the doctor edge portion 16 of the head, so that streaks are prevented from being formed on the film of liquid 2. When the web 1 is lapped with the entire web-facing surface of the edge part of the head 3, the liquid 2 is already being discharged from the slot 3a so that the web is not in contact with the web-facing surface of the edge part. For that reason, even if the speed of the application is increased such that the likelihood of streaking and scraping the web is high, the streaking and scraping can be very precisely prevented, to thereby stably manufacture a high-quality magnetic recording medium of good electromagnetic converting property with high yield and productivity.

Figure 5:
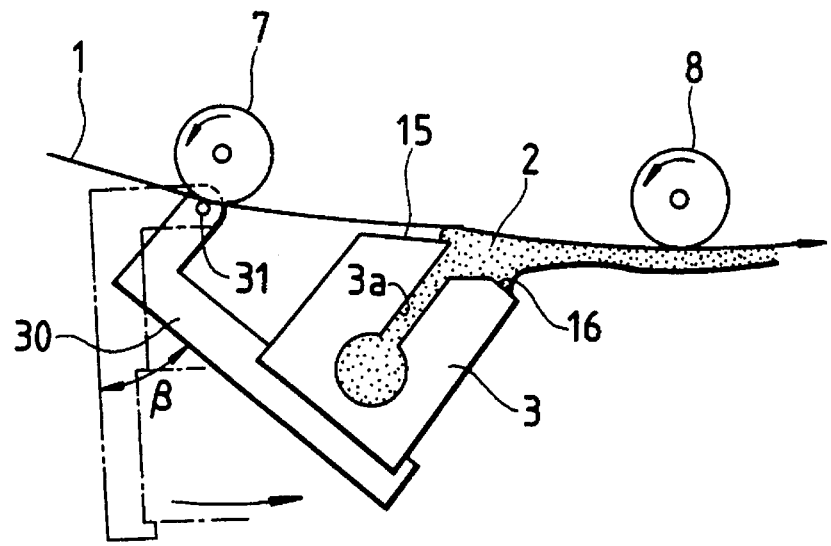
FIGS. 5 and 6 are sectional views showing the case that the application head 3 is swung.
Figure 6:
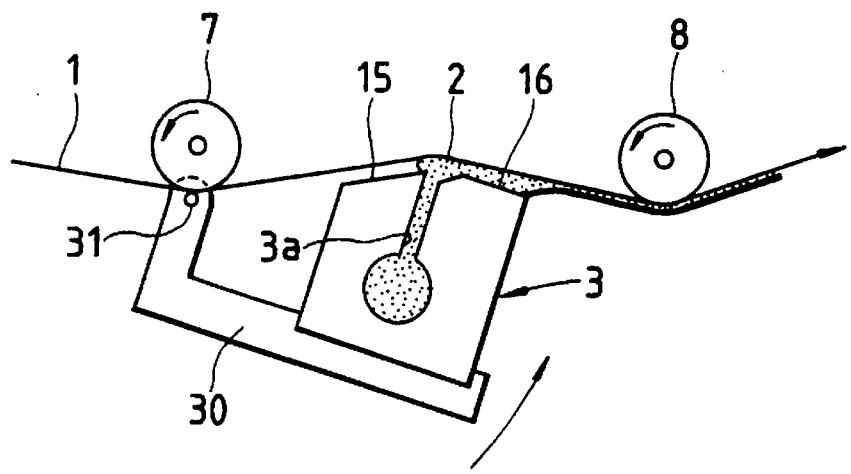

Although both the application head 3 and the path rollers 7 and 8 can be translated in the application device shown in FIG. 1, the present invention is not confined thereto but may be otherwise embodied as described with reference to FIG. 5 and 6 from now on. In an application device shown in FIGS. 5 and 6, the positions of path rollers 7 and 8 are fixed, and an application head 3 is supported by a pivot arm 30 which is pivotable about a fulcrum 31 in the direction of the arrows in FIGS. 5 and 6. To start applying a liquid 2 to the web 1 by the device shown in FIGS. 5 and 6, the application head 3 is initially rotated by a prescribed angle β from a displaced position so as to place the back edge portion 15 of the head near the web or in slip contact therewith. The liquid 2 is thereafter discharged from the slot 3a of the head, and the head is then rotated further so as to lap the web with the doctor edge portion 16 of the head at a lap angle for the application. Since the head 3 is thus swung with the arm 30, the application device is not only relatively simple but also the fulcrum 31 can be located near the place of contact of the web 1 and a path roller 7 so as to keep the angle of the approaching web 1 with respect to the back edge portion 15 of the head constant at the time of rotating the head with the arm.

In an application method provided in accordance with the present invention, an extrusion-type application head faces the surface of a flexible band-like carrier being continuously conveyed by path rollers, so that when the application of a liquid to the carrier is to be started or resumed, the carrier is placed near the back edge portion of the head or in slip contact therewith. Thereafter, the liquid is discharged from the slot of the head, and the carrier and the doctor edge portion of the head, which is located downstream of the slot, are then lapped with each other at a prescribed lap angle for the subsequent application. For that reason, scraped chips, created by contact between the carrier and the back edge portion of the head at the beginning or resumption of the application, are moved downstream due to the flow of the liquid. Accordingly, the scraped chips are not trapped at the upstream edge of the doctor edge portion of the head because the carrier is not lapped with all the carrier-facing surface of the edge part of the head at the initial stage of the contact, at which the scraped chips are made, and the contact time is very short. Further, even if the chips become trapped at the upstream edge of the doctor edge portion of the head at the initial stage of the contact, the chips would altogether move downstream by the flow of the liquid when the liquid was discharged from the slot of the head. As a result, there are no resulting streaks which would otherwise form on the film of the applied liquid on the carrier due to the scraped chip at the beginning or resumption of the application. Therefore, even if the speed of the application is increased such that the likelihood for troubles due to streaking and scraping of the carrier is increased, streaking and scraping can be significantly reduced to stably manufacture a high-quality magnetic recording medium of good electromagnetic converting property with high yield and productivity.

The effect of the present invention is hereafter clarified by describing an actual example of the embodiment of the invention and a comparative example.

EXAMPLE

The application device which is shown in FIG. 1, in which the application head 3 and the path rollers 7 and 8 are movable and the position changers 6, 12 and 13 are hydraulic cylinders, was used to perform application in the method described above. Substances shown in Table 1 were put in a ball mill so that the substances were well mixed and dispersed together. Thirty parts by weight of an epoxy resin of 500 in epoxy equivalent were added to the mixture and uniformly mixed and dispersed therewith so that a magnetic liquid was manufactured.

TABLE 1

| | |
|---|---|
| γ-Fe$_2$O$_3$ powder (spicular grains of 0.5μ in mean diameter along major axis and 320 oersted in coercive force) | 300 parts by weight |
| Copolymer of vinyl chloride and vinyl acetate (87:13 in copolymerization ratio and 400 in polymerization degree) | 30 parts by weight |
| Electroconductive carbon | 20 parts by weight |
| Polyamide resin (300 in amine value) | 15 parts by weight |
| Lecithin | 6 parts by weight |
| Silicone oil (dimethyl polysiloxane) | 3 parts by weight |
| Xylol | 300 parts by weight |
| Methyl isobutyl ketone | 300 parts by weight |
| N-butanol | 100 parts by weight |

Using the application device, the magnetic liquid was applied to a carrier made of a polyethylene terephthalate film. Table 2 shows the factors for the application.

TABLE 2

| | |
|---|---|
| Thickness of applied film on carrier after drying | 5μ |
| Thickness of carrier | 15μ |
| Width of carrier | 500 mm |

TABLE 2-continued

| | |
|---|---|
| Speed of application | 200 m/min. |
| Tension of carrier | 5 kg (for 500 mm in width) |
| Width of slot | 0.5 mm |
| Diameter of liquid reservoir | 15 mm |

The carrier 1 was moved toward the back edge portion of the application head 3. The magnetic liquid was thereafter discharged from the slot of the head. The carrier 1 and the doctor edge portion of the head 3 were then lapped with each other at the lap angle for the application. After that, the application was started. After the liquid was applied to the carrier by a prescribed length, the application was stopped and then resumed. The application, the stoppage thereof and the resumption thereof were repeated. The movement of the application head 3 and the path rollers 7 and 8 was detected by the limit switches. At the lapse of 0.3 second after the reception of the signals, the changeover valve 25 was opened so that the magnetic liquid was sent to the application head 3. The state of the surface of the applied film on the carrier immediately after the start of the application was inspected. Table 3 shows the result of the inspection.

Comparative Example

In the application method disclosed in the Japanese Patent Application (OPI) No. 95169/87, the same magnetic liquid was applied to the same carrier by the same application device with the same factors as the actual example. In the method, the application head 3 was moved by the position changer 6 so as to be placed into contact with the carrier, the application was then started, and the application was thereafter stopped and resumed. The application, the stoppage thereof and the resumption thereof were repeated. The state of the surface of the applied film on the carrier immediately after the start of the application was inspected. Table 3 shows the results of the inspection.

TABLE 3

| Sample | It was inspected in detail whether streak was made on surface of applied film on carrier portion of about 10 m in length immediately after start of application |
|---|---|
| Actual example | No streak was made. |
| Comparative example | Slight streak was made |

It is understood from Table 3 that the result of a visual observation of the state of the surface of the applied film with regard to whether a longitudinal streak was made on the surface was better for the actual example than for the comparative example. Therefore, according to the present invention, a high-quality magnetic tape can be manufactured with higher yield.

We claim:

1. An apparatus for applying a liquid to a flexible band-like carrier having a transverse width, comprising:

an application head having a back edge portion, a doctor edge portion and slot disposed therein, said head facing said carrier;

means for initially positioning said carrier along the entire transverse width thereof and the back edge portion only of said head near each other or in slip contact with each other;

means for discharging said liquid from said slot in said head so that any scraped chips formed by the initial contact between said head and said carrier are removed by said liquid in a downstream direction beyond the doctor edge; and means for lapping said carrier and the doctor edge portion of said head, which is located downstream of said slot with regard to the direction of the conveyance of said carrier, with each other at a prescribed lap angle for said application.

2. An apparatus for applying a liquid to a flexible band-like carrier having a transverse width, comprising;

an application head having a back edge portion, a doctor edge portion and a slot disposed therein, said head facing said carrier;

means for initially positioning said carrier along the entire transverse width thereof and the back edge portion only of said head near each other or in slip contact with each other;

means for discharging said liquid from said slot in said head so that any scraped chips formed by the initial contact between said head and said carrier are removed by said liquid in a downstream direction beyond the doctor edge; and means for lapping said carrier and the doctor edge portion of said head with each other at a prescribed lap angle for said application, wherein said means for initially positioning comprises:

a path roller located upstream of said head with regard to the direction of the running of the carrier; and means for moving said path roller along an entire length thereof in the direction of the thickness of said carrier so that the angle of the lap of said carrier to said back edge portion of said head is adjusted.

3. An apparatus according to claim 1, wherein said means for lapping comprises:

a path roller located downstream of said head with regard to the direction of the running of the carrier; and means for moving the path roller along an entire length thereof in the direction of the thickness of said carrier so that the angle of the lap of said carrier to said doctor edge portion is set.

4. An apparatus for applying a liquid to a flexible band-like carrier having a transverse width, comprising an application head having a back edge portion, a doctor edge portion and a slot disposed therein, said head facing said carrier;

means for initially positioning said carrier along the entire transverse width thereof and the back edge portion only of said head near each other or in slip contact with each other;

means for discharging said liquid from said slot in said head so that any scraped chips formed by the initial contact between said head and said carrier are removed by said liquid in a downstream direction beyond the doctor edge; and means for lapping said carrier and the doctor edge portion of said head with each other at a prescribed lap angle for said application, wherein said means for initially positioning comprises means for rotating said head by a prescribed angle so that the carrier and the back edge portion of said head are placed near each other or in slip contact with each other; and wherein said means for lapping comprises means for rotating said head again so that said carrier is lapped with the doctor edge portion of said head at the prescribed lap angle for application.

* * * * *